Aug. 29, 1967     A. G. MIREL     3,338,177
AUTOMATIC ARTICLE-TRANSPORTING SYSTEM
Filed Dec. 28, 1964     8 Sheets-Sheet 1

INVENTOR
ARTHUR G. MIREL
BY
*Percy Freeman*
ATTORNEY

Aug. 29, 1967 A. G. MIREL 3,338,177
AUTOMATIC ARTICLE-TRANSPORTING SYSTEM
Filed Dec. 28, 1964 8 Sheets-Sheet 4

INVENTOR
ARTHUR G. MIREL
BY *Percy Freeman*
ATTORNEY

Aug. 29, 1967     A. G. MIREL     3,338,177
AUTOMATIC ARTICLE-TRANSPORTING SYSTEM
Filed Dec. 28, 1964     8 Sheets-Sheet 8

INVENTOR.
ARTHUR G. MIREL
BY
ATTORNEY

United States Patent Office 3,338,177
Patented Aug. 29, 1967

3,338,177
AUTOMATIC ARTICLE-TRANSPORTING
SYSTEM
Arthur G. Mirel, 148 Vernon Drive,
Scarsdale, N.Y. 10583
Filed Dec. 28, 1964, Ser. No. 421,359
13 Claims. (Cl. 104—88)

The present invention relates to systems for automatically transporting articles.

While systems of this general type are known, they suffer from many serious drawbacks. For example, pneumatic systems are known wherein articles are placed in containers which are inserted into the pneumatic system to be carried along thereby. Such known systems are extremely expensive to manufacture since they must be especially designed for a given installation. In addition, they are extremely inefficient because the tubes of the system must be constantly supplied with air under pressure, whether or not any containers are flowing through the system. Furthermore, a characteristic of the known automatic pneumatic systems is that all the containers, irrespective of where they are introduced into the system, are delivered to a given central receiving station from where they are dispatched to other stations, so that the entire system is rendered extremely complex and inefficient by the necessity of providing a central receiving and sending station. Furthermore, with known systems the amount and type of articles which can be transported is seriously limited, particularly in view of the attendant high-energy transmission line losses when using a gaseous medium.

It is, therefore, primarily an object of the present invention to provide an automatic article-transporting system which will avoid all of the above drawbacks and others.

In particular, it is an object of the present invention to provide a system which does not rely on an inefficient motive source such as a gaseous fluid under pressure. The system of the present invention relies on simple mechanical elements for mechanically transporting a carrier.

Also, it is an object of the present invention to provide a system which will operate only when there is a carrier to be transported, so that the system does not operate when there is no necessity for transporting carriers, and thus there is a considerable saving of power.

Furthermore, it is an object of the present invention to provide an automatic article-transporting system which is made up of a plurality of self-contained modules, of which only a relatively small number of different types are required, so that these modules can be prefabricated with all necessary mechanical and electrical components and then assembled at the site of the system, thus providing a construction which does not require separate power or logic systems.

In addition, it is an object of the present invention to provide a system of the above type which does not require any central receiving station as well as a central dispatching station, so that the system of the invention is considerably simplified, as compared to known systems.

Furthermore, it is an object of the present invention to provide for a system of the above type carriers which are capable of carrying a wide variety of articles whose size and number and weight greatly exceed what has heretofore been economically possible with known systems.

Furthermore, it is an object of the present invention to provide automatic high payload/high volume carriers than can double as shipping containers and storage receptacles for small parts. Small parts manufactured at a site remote to an assembly area may be inspected and shipped in such carrier to a receiving station for automatic dispatch to storage areas. Retrieval and subsequent dispatch to designated assembly areas can be performed merely by the pressing of a button and can be programmed to an infinite variety of combinations.

In addition, it is an object of the invention to provide for a system of the above type a simple electrical control structure which will reliably control the movement of the carriers to and from the system as well as along the system in such way that there will be no collisions between carriers.

Furthermore, it is an object of the present invention to provide a system of the above type which can be constructed so as to have articles moving always in one direction or in a pair of opposed directions, and in addition the system of the invention is adapted for use either on a single level or at various different levels and at various angles communicating therewith.

In addition, it is an object of the present invention to provide a system of the above type which eliminates the inefficiencies of human messenger service. The expense and waste associated with the use of unskilled labor can be appreciably reduced. With payload/high volume carriers shuttling between work areas and central supply and service depots (i.e., tool cribs, mail rooms, file rooms, etc.) reduce the expense associated with personnel being absent from their respective work areas. Personnel stay at their jobs—productivity increases.

Furthermore, it is an object of the present invention to provide for a system of the above type a storage assembly capable of storing a carrier with the articles carried thereby at a predetermined location until the carrier and articles are required whereupon they can be automatically returned to the system to be delivered to a selected station. In particular, it is an object of the invention in this connection to provide a system which adapts itself to remote controls according to which, for example, an operator can simply dial a suitable control assembly in order to set into motion in a fully automatic manner structure which will deliver to the operator a selected carrier and articles carried thereby.

Furthermore, it is an object of the present invention to provide a system of the above type which will reliably transport the carriers through the system at a predetermined rate of speed.

In particular, it is an object of the invention to provide a structure which will sense the weight of a carrier and the articles carried thereby so as to control the speed in accordance with the accelerating force required to move a carrier and articles carried thereby of a given total weight at the given speed for which the entire system is set.

The objects of the present invention also include the provision of the structure capable of accomplishing all of the above objects and at the same time composed of simple rugged elements which are simple to assemble, which are very reliable in operation, and which can be manufactured at a relatively low cost.

The automatic article-transporting system of the invention primarily includes a rail means which extends along a predetermined path along which a plurality of stations are located. A plurality of carriers are adapted to carry articles which are to be transported, and a support means is operatively connected to each carrier to support the latter on the rail means, the support means moving along the rail means during transportation of articles carried by a carrier. An advancing means extends at least in part along the rail means and engages the support means for advancing the latter together with the carrier to which it is operatively connected along the rail means so as to transport the carriers along the predetermined path. Each carrier is provided with an adjustable station-designating means which has a plurality of different positions respectively designating the plurality of stations, and thus the operator can place the adjustable station-designating means in a selected position thereof which will designate a station. A plurality of different station-identifying means are respectively situated at the several stations of the system and these station-identifying means respectively match the positions of the station-designating means carried by each carrier. Each station-identifying means is capable of coacting with the station-designating means of each carrier for detecting the presence of a matching station-designating means, and each station-identifying means, when it does in fact detect the presence of a matching station-designating means of a given carrier, will actuate the advancing means to terminate the transporting of the particular carrier which carries the matching station-identifying means at the particular station where the matching station-identifying means is situated, so that in this way a carrier will be automatically transported to a preselected station.

The invention is illustrated by way of example in the accompanying drawings which form part of the application and in which.

Figure 1:
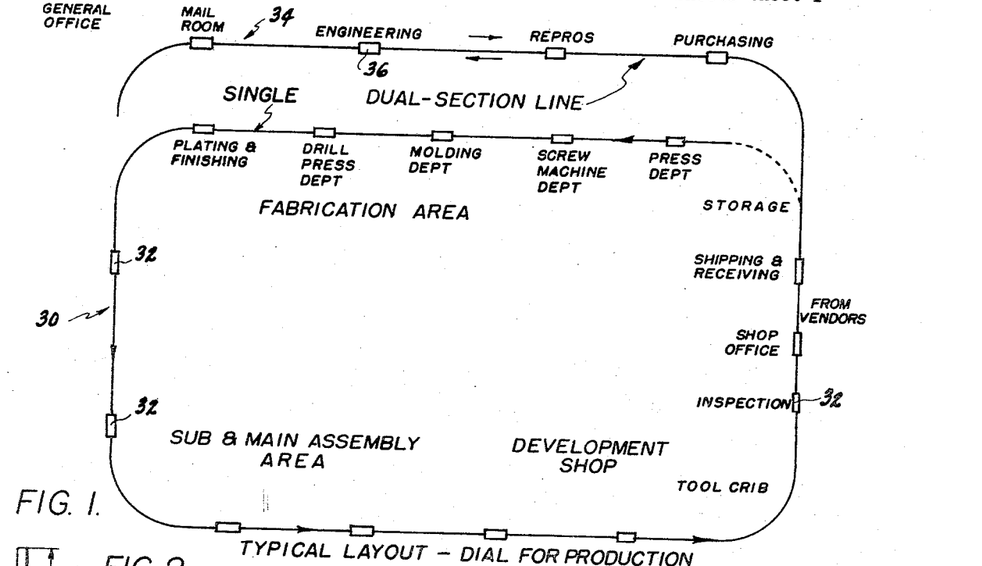
FIG. 1 is a schematic representation of a typical layout of an article-transporting system of the invention.

Referring to FIG. 1, there is shown therein a typical system 30 according to the present invention, for transporting articles to the various stations 32. As is apparent from FIG. 1, the system 30 is in the form of a closed loop wherein all of the articles are carried in a clockwise direction through the loop, as is apparent from the arrows in FIG. 1. The stations 32 are located at the various departments, such as those indicated for a typical manufacturing plant, and at any of the stations 32 carriers can be introduced into the system 30 or removed therefrom in a manner described in much greater detail below. With this system 30 of the present invention, anybody at any one of the stations 32 can introduce a carrier into the station at which he is situated for delivery to any other station, so that, for example, personnel at the screw machine department or the drill press department need not queue up at the tool crib in order to obtain tools. In fact, while it is, of course, possible for personnel at various departments to phone other departments for materials which could be shipped with the system 30, the designation "dial for production" indicates a remote control system according to which anybody at any department can dial a suitable identifying number or combination of numbers and letters which will automatically remove from storage materials corresponding to the code used in the dial system, so that through this control system it is possible to obtain materials from storage without the necessity of any personnel traveling from one location to another, as will also be apparent from the description below. In this way, articles received from vendors, as shown at the right in FIG. 1, for example, can pass through shipping and receiving and be delivered to any selected station, and in the same way various other articles can be delivered from any one station to any other station along the endless path which extends throughout the system 30. It is to be noted in particular that this system requires no central receiving station from which all articles are dispatched to the other stations and to which all articles must be delivered in order to be dispatched to the other stations.

Of course, it happens that the type of plant having departments as designated in FIG. 1 lend itself most efficiently to the use of a single closed loop system 30 where the articles travel through the system in only one direction. However, other types of operations will lend themselves to a more efficient use of the structure with simultaneous movement of carriers in opposite directions along the given path, and this type of path is indicated for the dual-section line 34 at the upper part of FIG. 1, where it will be seen that different types of departments are situated at various stations 36 along the system 34 in which carriers may move simultaneously in opposite directions so that there is a far greater efficiency in the communication between the various departments.

Figure 2:
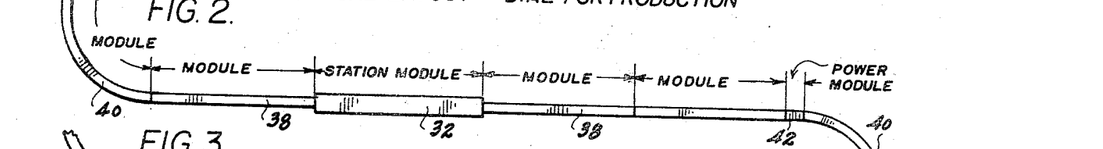
FIG. 2 shows in plan view, diagrammatically, part of a system according to the invention.

According to one of the important features of the present invention, the system 30 and 34 is composed of modules which can be prefabricated and thereafter assembled at the side of the installation. In accordance with the invention, a relatively small number fo different types of modules may be assembled in any desired combinations so as to form any system which will be particularly suited for particular installation. Thus, referring to FIG. 2, it will be seen that the stations 32 are themselves in the form of station modules, and the construction of each station module is identical with that of every other station module, except for a structure for identifying the particular station, which will be discussed below. Elongated straight modules 38 can be interconnected either in end to end relation or to other modules so as to provide any desired length of straight path of movement for the carriers. In order to provide curves in the path, curved modules 40 are provided, and these curved modules also are identical and are capable of being interconnected either with other curved modules 40 or with any other of the modules. In addition, there is shown in FIG. 2 a power module 42 which may be constructed so as to provide the power which is necessary for operation of the remaining modules.

Figure 2A:
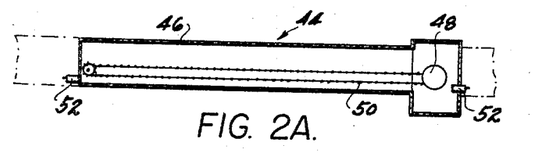
FIG. 2A shows diagrammatically and in section the structure of one of the modules illustrating a combined power element and article advancing element.

It has been found in practice that straight line modules may be made, for example, in 10' lengths, and that a power module 42 may be added wherever the multiple of modules may require. However, FIG. 2A shows a modified construction according to which a module, irrespective of where it fits into the entire system, may be provided with its own source of power and forms a complete unit in and of itself. Thus, referring to FIG. 2A, there is shown therein a typical module 44 which may be any of the modules of FIG. 2 except the power module 42 which is not needed when the modules 44 are used. As is apparent from FIG. 2A, the module is housed in a suitable elongated tubular enclosure 46 which may be of square or rectangular cross section, and at the right end of the module there is a suitable motor or other source of power 48 which drives a chain 50 schematically indicated in FIG. 2A and guided over suitable pulleys and the like, so that in this way the module 44 forms a complete entity in and of itself with its own source of power. Of course, various details such as the rails for guiding the carriers and the transmission from the motor to the chain 50 and the like are omitted from FIG. 2A for the sake of simplicity, all of these details being described below. However, it is to be noted that at the ends of the module 44 there are suitable electrical connectors 52 which, when engaged, make electrical connection with succeeding and preceding modules, so that in this way electricity from any suitable source can be transmitted throughout the system to the electrical components thereof. Thus, with this construction, as diagrammatically shown in FIG. 2A, the several modules need only be placed in a preselected series in end to end relation and connected together so as to form the system of the invention.

Figure 3:
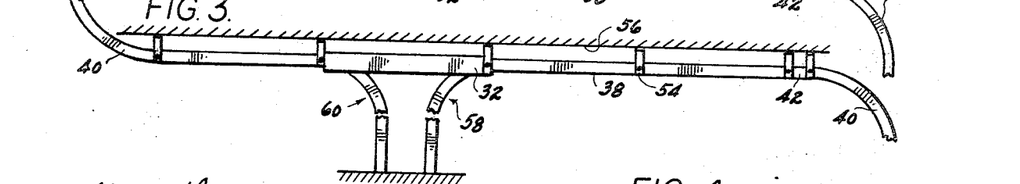
FIG. 3 shows the structure of FIG. 2 in elevation, also in a diagrammatic manner.

As may be seen from FIG. 3, the various modules may be suspended by suitable straps 54 or the like, from any support structure 56 of the area in which the system is located, and at the various stations 32 additional structure such as an ingress means 58 and an egress means 60, both described in greater detail below, may be provided for introducing carriers into the system and removing the carriers from the system. With the arrangement shown in FIG. 3, it is assumed that the carriers move from left to right in order for the structure 60 to form the egress means and the structure 58 to form the ingress means. In the event that the structure moves in the opposite direction, from right to left as viewed in FIG. 3, then the unit 60 would be the ingress means while the unit 58 would be the egress means.

Figure 4:
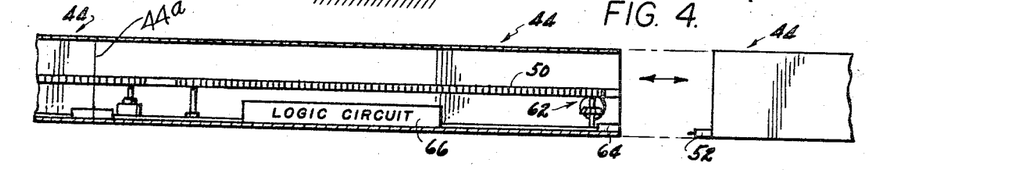
FIG. 4 diagrammatically illustrates the manner in which modules are assembled.

Referring to FIG. 4, the manner in which the successive modules, such as the modules 44, are assembled together is shown also schematically but in elevation. Thus, it will be seen that the electrical connectors 52 mate with connectors 64 of the adjoining modules, and the central module 44 shown in FIG. 4 is situated between the modules shown at the right and left of FIG. 4, the central module of FIG. 4 having already been assembled with the left module of FIG. 4 as at 44a, while the right module of FIG. 4 is being joined to the central module of FIG. 4, so that the connector 52 shown in FIG. 4 at the left end of the right module 44 will join together with the electrical connector 64 at the right end of the central module 44 of FIG. 4 in order to provide an electrical connection therewith, and the ends of the modules are connected together to any suitable mechanical construction, to provide an elongated tubular enclosure in which the transporting structure is housed. The structure in each module includes the transmission 62 which serves to drive the chain 50. In addition, each module is provided with electrical circuitry, such as the logic circuit 66, which is described in greater detail below and which serves to identify various carriers to the end that they are automatically delivered to the proper stations, while this circuit is also arranged to provide against any collisions between carriers.

Figures 5, 6:
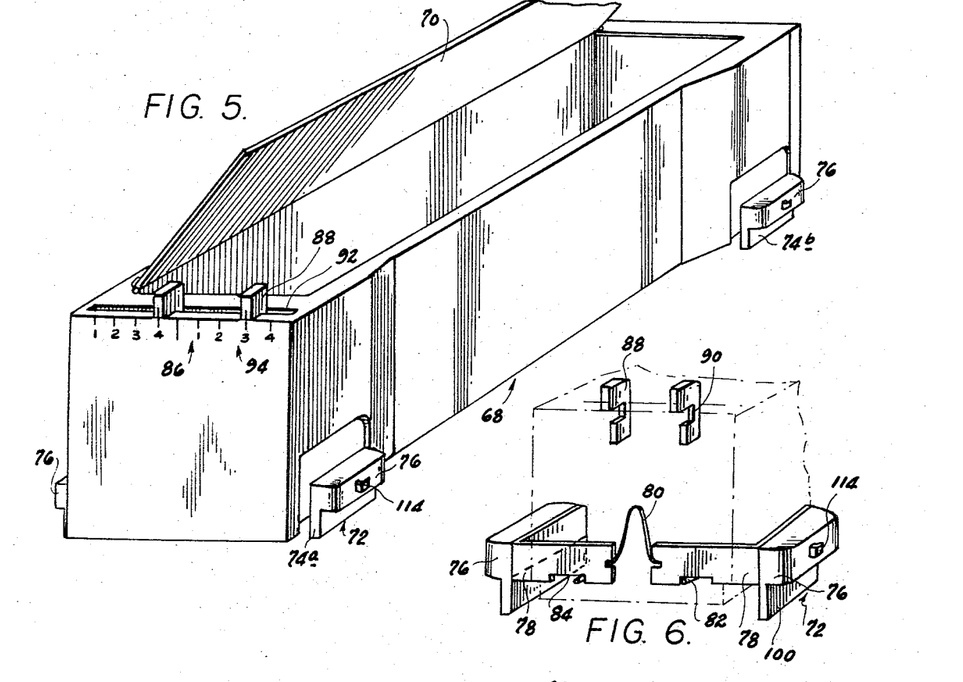
FIG. 5 is a perspective illustration of one possible construction of the carrier according to the present invention.
FIG. 6 is a perspective illustration of a unit of a support means for the carrier, FIG. 6 also illustrating part of the adjustable station-designating structure carried by the carrier of the invention.

Referring now to FIG. 5, there is shown therein a carrier 68 of the present invention, it being understood that there are, of course, a relatively great number of carriers 68 which can be traveling through the system of the invention at any given time. The carrier 68 of the present invention is in the form of an elongated hollow container having an open top capable of being closed by a suitable hinged cover 70 or the like, so as to reliably maintain in the carrier the articles which are placed therein. Obviously, if desired, the cover may have latching or locking means. The carrier 68 is preferably, though not necessarily, of a rectangular or square cross-sectional configuration so as to take advantage of the space through which the carrier travels. However, the ends of the carrier are somewhat wider than an elongated intermediate portion which extends between these ends, in order that the carrier 68 of the invention be capable of executing turns without binding on the rail means of the invention along which the carriers travel, as pointed out in greater detail below.

A support means 72 is provided for supporting the carrier 68 on the rail means as well as for cooperating with an advancing means of the invention which advances each carrier 68 along the rail means, and this support means 72 includes a front unit 74a and a rear unit 74b which may be substantially identical with the front unit. Each unit of the support means 72 includes a glide 76 at each side of the unit, and the glides 76 for the front unit of the carrier 68 are particularly apparent from FIG. 6. In the same way, a pair of glides 76 are provided for the rear unit. These glides are adapted to engage and slide along the rails as will be apparent from the description which follows. The supporting glides 76 are carried by angle brackets 78 guided for slidable movement on the carrier in a manner described in greater detail below, and the glides are situated at the exterior of the carrier at the sides thereof and at the front and rear ends thereof, as indicated most clealy in FIG. 5. The pair of angle brackets 78 of each unit are urged apart from each other by a spring 80, but each end wall of each carrier 68 fixedly carries a pair of pins 82 which respectively extend into notches 84 of the angle brackets 78, respectively, so as to limit the extent of outward movement of the brackets by the spring 80, and in this way the supporting structure 72 is reliably maintained connected to the carrier 68 even if the latter is not traveling through the system.

In this latter connection, it is to be noted that the carriers 68 are quite useful outside of the system in that their dimensions and configurations are such that they can readily be used as tote boxes for carrying about tools or other articles, so that the very same tote boxes which can be used for manually transporting articles throughout a plant may also be used in the system of the invention.

In addition to the structure described above, each carrier 68 is provided with a station-designating means 86 which is adjustable so that the operator can set the station-designating means 86 to designate any selected station to which the carrier 68 is to be delivered automatically by the system.

In the particular example shown in FIG. 5, the station-designating means 86 includes two series of numerals with a pair of sliders 88 shiftable along the front edge of the carrier so as to be aligned with selected numerals and thus the various stations can be designated. For example, with the position of the parts shown in FIG. 5, the station "4–3" has been designated by the indicated position of the sliders 88. However, these sliders can be shifted to any other desired position. As is apparent from FIG. 6, the sliders are notched so as to receive a flange of the top wall of the carrier 68, and in this way the sliders are guided for lateral movement along this front flange at the top of the front end wall extending transversely thereacross, and the narrow portions 90 of the sliders extend through a slot 92 formed in the top wall of the carrier 68, so that the sliders are retained in the slot 92 while being shiftable to any selected location along the scale of identifying indicia 94.

Figures 7, 8:
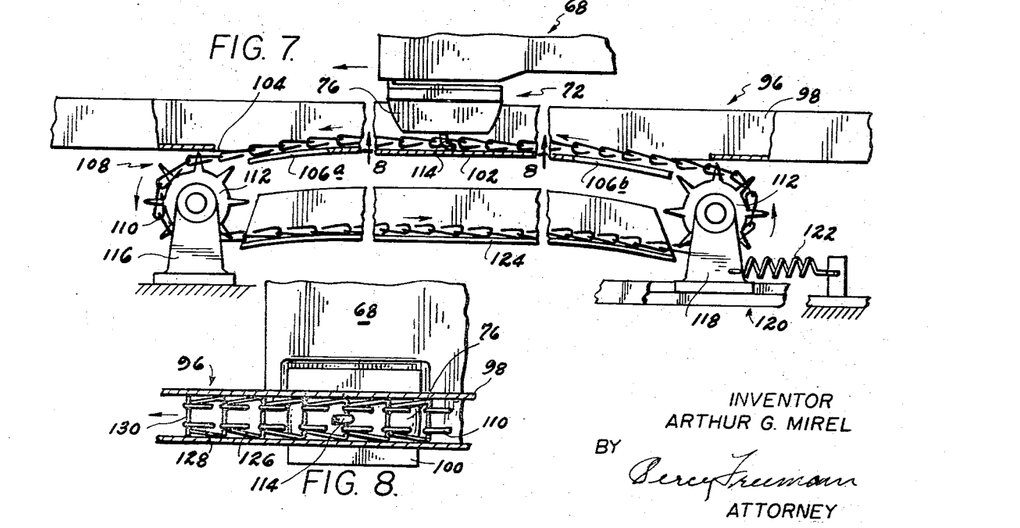
FIG. 7 is a fragmentary top plan view showing the rail means of the invention as well as an advancing means cooperating therewith and engaging a support means connected to a fragmentarily illustrated carrier for advancing the carrier to the left, as viewed in FIG. 7.
FIG. 8 is an elevation, on an enlarged scale as compared with FIG. 7, fragmentarily showing the details of the advancing means of the invention.

FIG. 7 illustrates the details of the rail and advancing means of the invention as well as of the manner in which the rail means and advancing means cooperate not only with each other but with a carrier 68, and in particular with the support means 72 thereof. As may be seen from FIG. 7, the rail means 96 includes elongated channel members 98 which have upper and lower walls into which the glides 76 extend, these glides resting on the lower walls of the channel members 98 while sliding therealong. As is apparent from FIG. 6, each glide 76 has a downwardly directed flange 100, and the outer surface of this flange engages the free edge of the lower wall of the channel member 98 which forms the rail means 96. Of course, the spring 80 yieldably presses the outer surface of the flange 100 of each glide 76 against the free edge of the lower wall of the channel member 98.

At spaced portions which are adjacent the ends of a module, the transverse wall 102 of the channel 98 is formed with openings 104 and a part of this transverse wall 102 is curved outwardly as indicated at 106a and 106b in FIG. 7.

The advancing means 108 of the invention includes a plurality of endless chains 110 which are guided and driven by sprockets 112, and it is to be noted that one run of the endless chain 110 extends through the openings 104 along the interior of the channel member 98 to be guided by the wall 102 thereof, while the outwardly curved portions 106a and 106b guide the advancing run of the endless chain 110 to and from the sprockets 112 in the manner shown most clearly in FIG. 7. The run of the chain which at any moment is in the interior of the channel member 98 engages a hook 114 of the support means 72 for advancing the latter together with the carrier 68, as shown most clearly in FIG. 7. The left rotary sprocket 112 of FIG. 7 is supported for rotation on suitable bearings which directly engage a shaft which may be fixed to the sprocket 112, and these bearings are carried by a stationary pillow block 116 while the other end of the chain is guided by an identical sprocket 112 mounted in the same bearings, but in this case the bearings are carried by a movable pillow block 118 guided for longitudinal movement by any suitable guiding structure 120, as indicated in FIG. 7, and a spring 122 is connected to the shiftable pillow block 118 to urge the latter to the right, as viewed in FIG. 7, so that a suitable tension is maintained in the endless chain 110 which forms part of the advancing means of the invention. The outer run of the endless chain, this outer run being located outside of and beyond the rail means 96, is guided through a suitably stationary guide channel or angle member 124, as indicated in FIG. 7. The use of a spring 122 and a shiftable pillow block 118 is of practical importance inasmuch as in this way a suitable tension is maintained in the chain while at the same time the structure is capable of yielding when certain shock loads are applied as when the chain initially engages a hook 114 of the support means 72 of a relatively heavy carrier.

A plurality of endless chains 110 are used throughout the system in assemblies as shown in FIG. 7, and is of a structure which is particularly adapted for use with the system of the invention. Thus, as may be seen from FIG. 8, each endless chain 110 is composed of a series of links 126 which may be made of a suitable wire and which is of a generally U-shaped configuration with the free ends of the legs of each link 126 bent backwardly upon itself around the cross member of the next adjoining link, as indicated most clearly in FIG. 8, where the free ends 128 of the legs of the links 126 are shown bent around the cross members 130 of the links. This construction is preferred, not only because it is simple and inexpensive, but also because the rearwardly curved leg portions 128 are capable of shifting along and tilting with respect to the cross portions 130 of each link, so that the particular chain 110 which is illustrated in FIG. 8 not only can extend in a straight line but also can curve transversely through an arc of a circle of relatively small radius, and, therefore, the chain 110 of the structure shown particularly in FIG. 8 is particularly adapted for systems where the path must curve rather sharply to provide changes in direction substantially perpendicular to the plane of the chain.

FIG. 8 shows the hook portion 114 of the support means of the carrier 68 engaging one of the links 126 while the chain advances to the left, as shown by the arrow in FIG. 8, and, of course, also shows the glide 76 extending into the channel 98. It is to be noted that FIG. 8 also shows the flange 100 of the guide extending below the bottom wall of the rail means 96 in FIG. 8.

Figures 9, 10, 11, 11A, 12, 13:
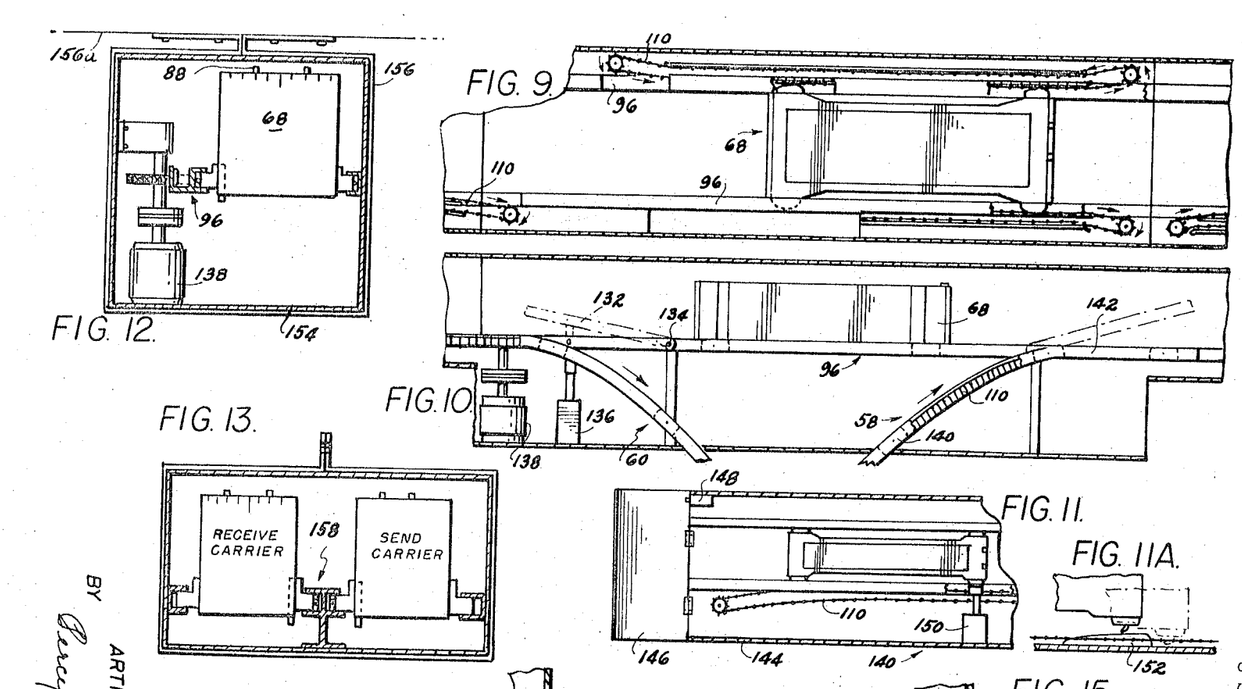
FIG. 9 is a partly diagrammatic sectional plan view illustrating the structure at one of the stations which are located along the predetermined path of movement of the carriers.
FIG. 10 shows the structure of FIG. 9 in elevation, FIG. 10 in particular illustrating an egress and ingress means at a station.
FIG. 11 is a partly sectional fragmentary schematic illustration of the structure of an ingress means of the invention.
FIG. 11A illustrates a cam controlling the engagement between a support means of a carrier and the advancing means during introduction of a carrier to the path of movement through an ingress means of the invention.
FIG. 12 shows in a transverse cross section the details of a module according to which the carriers are advanced in one direction along a predetermined path.
FIG. 13 shows a variation of the structure of FIG. 12 according to which the carriers can simultaneously move in opposite directions along the given path, in a single duct.

Referring to FIGS. 9 and 10, the structure of a station module is illustrated therein. The chain 110 shown at the lower left of FIG. 9 is driven by the motor 138 and advances the carriers to the right, as viewed in FIGS. 9 and 10, the carriers moving along the rail means 96 in the manner described above. It is to be noted that one chain 110 is displaced after preceding chain 110 by a distance which is less than the distance between the supporting units respectively situated at the front and rear of each carrier 68, so that while the rear unit of the support means engages one chain, the front unit will engage the next chain, and in this way continuity of transportation of the carriers through the system is assured.

As may be seen particularly from FIG. 10, the station module includes a diverting rail section 132 which is pivoted at 134 to a succeeding section of the rail means 96, and a solenoid means 136 is operatively connected to the diverting rail 132 in order to raise the latter to the diverting position shown in dot-dash lines in FIG. 10. When the diverting rail section 132 is in its lower solid-line position shown in FIG. 10, it forms a continuation of the preceding and succeeding rail sections, so that in this non-diverting position of the rail section 132 a carrier will simply move straight through the station without being diverted to the egress means 60. However, when the rail section 132 is raised about its pivot 134 by the solenoid 136 to its diverting position shown in dot-dash lines in FIG. 10, then the carrier 68 will move outwardly along the egress means 60 which is simply in the form of a curved rail means branching from the horizontal rail means and delivering the carrier to the exterior of the station. Of course, there are a pair of diverting rails 132 which are moved in unison about a common pivot axis, as is shown more clearly in FIG. 16 and as is described in greater detail below.

The ingress means 58 at each station involves substantially the reverse of the egress means. An endless chain extends along a curved rail means 140, and this endless chain can be the same as any of the other chains 110. The top end of the curved ingress rail 140 is located adjacent the pivoted end of a diverting rail section 142 substantially identical with the rail section 132 except that it needs no solenoid to actuate it. Instead, the carrier glides 76 engage the rail section 142 to raise it to the dot-dash line position shown at the right in FIG. 10, and in this way a carrier simply moves into the path of movement along which this system extends. After the carrier has moved beyond the rail section 142 it returns by gravity to its position where it forms an extension of the preceding and succeeding rail section so that carriers moving through the station will not have their movement influenced in any way by the ingress means 140.

The inlet end of the ingress means 140 is shown in detail in FIG. 11. At its inlet end the tubular housing 144 of the ingress means has a hinged door 146 which, upon being opened permits switch 148 to be operated as described below, and upon closing opens the switch 148 to deenergize the solenoid 150 which releases the glide 76. As may be seen in modification shown in FIG. 11A, a stationary cam 152 may be situated along the side walls of the tubular housing 144 in order to engage the hooks and press them inwardly toward each other in opposition to the spring 80 shown in FIG. 6, and it is only when the hook snaps beyond the cam 152 into the chain 110 that the structure is connected to the chain 110 to be advanced thereby. This chain 110 is stationary until the door 146 closes so as to close the circuit through the switch 148, and then the driving motor, similar to the motor 138 of FIG. 10, is started to move the chain and advance the carrier into the path of the system, as described above.

Figure 14:
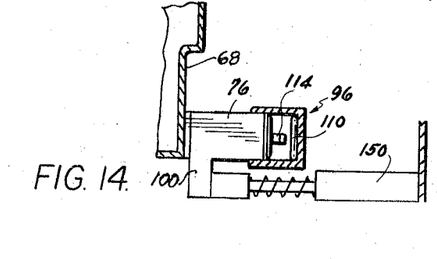
FIG. 14 shows in detail how the control structure of the invention temporarily maintains the support means of a carrier out of engagement with the advancing means.
Figure 15:
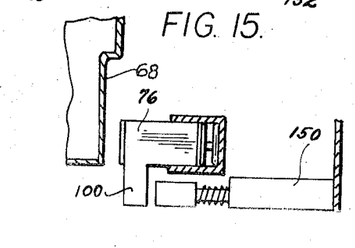
FIG. 15 shows the parts of FIG. 14 in the position they take when the support means has been released to engage the advancing means so that the carrier will be advanced.

The stationary cam system 152 illustrated in FIG. 11A is, of course, provided at both sides assuming that there are chains at both sides of the ingress means 58. However, an electrical control can be provided to time the engagement of the carrier 68 with the chain in such a way that collision between a carrier entering into the system and a carrier already in the system cannot occur. For this purpose, the solenoid 150 is provided, and as is indicated most clearly in FIG. 14, the solenoid 150 when energized will engage the glide 76 to keep the hook 114 displaced from the chain 110 which is guided in the rail means 96 of the ingress means 58. When the solenoid 150 is not energized it assumes the position shown in FIG. 15 where it permits the spring 80 to shift the glide to the position illustrated in FIG. 15 where the hook 114 engages the chain 110. The solenoid 150 is controlled by an electrical circuit represented as the logic circuit in FIGS. 4 and 27; this circuit includes cumulative time holding relays which operate in such way that the solenoid 150 is not released from the position of FIG. 14 until the system senses, after the last carrier has moved through the station module, the next carrier approaching and reaching a point which is at such a distance from the point of intersection between the ingress means 58 and the horizontal rail means 96 that when the solenoid 150 is released to the position of FIG. 15, the newly introduced carrier will reliably reach the path along which the system extends before this next carrier can reach the intersection of the ingress means with the system, so that in this way the logic circuit assures no collision between the carriers.

As may be seen from FIG. 12, the outer tubular housing 154 of a typical module is fixed by the strap 156 to a support structure 156a. A motor such as the motor 138 drives the chain 110 which is guided for movement in the rail means 96 in the manner shown in FIG. 12 and described above. The outer rail means section shown at the right in FIG. 12 need not have any chain drive since the glides will support and move along the channel members of the rail means with a drive on only one side in order to advance the carrier 68.

The arrangement shown in FIG. 13 is substantially identical with that of FIG. 12 except that this arrangement is adapted for a dual system where carriers move simultaneously in opposite directions as indicated by the receive and send carriers of FIG. 13. With this system there is but a single chain which is mounted on the central rail section 158, as shown in FIG. 13, so that one run of the endless chain drives the "receive" carrier while the other run drives the "send" carrier, but otherwise the structure is identical in operation and operates on the very same principles.

Figure 16:
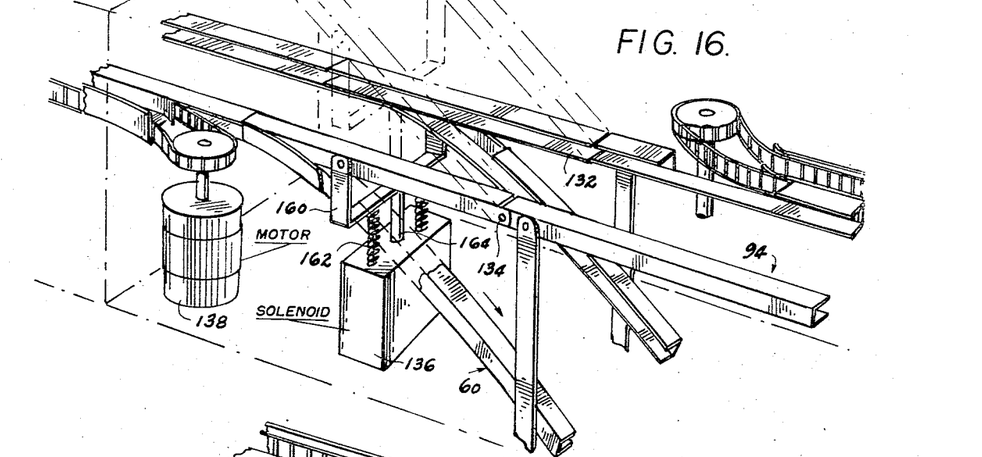
FIG. 16 is a fragmentary perspective illustration showing in detail the structure and operation of a diverting means at a station for diverting a carrier to an egress means at the station or for continuing the advancing of the carrier along the predetermined paths.

Referring now to FIG. 16, the egress means 60 is more clearly illustrated. This egress means simply takes the form of a pair of channel sections which curve downwardly from the rail means 94 which guides the carriers while they are moved by the chain 110 driven by the left motor 138 of FIG. 16. The solenoid 136 actuates a bracket 160 which is pivotally connected to the pair of diverting rail sections 132 which have a common pivot axis 134, and the armature 164 of the solenoid to the bracket 160 which is urged downwardly by the springs 162. When the sliders of the station-designating means of a carrier simultaneously close a pair of switches, indicating that the station for the particular carrier has been reached, then the solenoid 136 is energized to raise the pair of diverting rail sections 132 into the dot-dash line position of FIG. 16, and the carrier will move down the egress means 60 in the manner described above.

Figures 17, 17A, 17B:
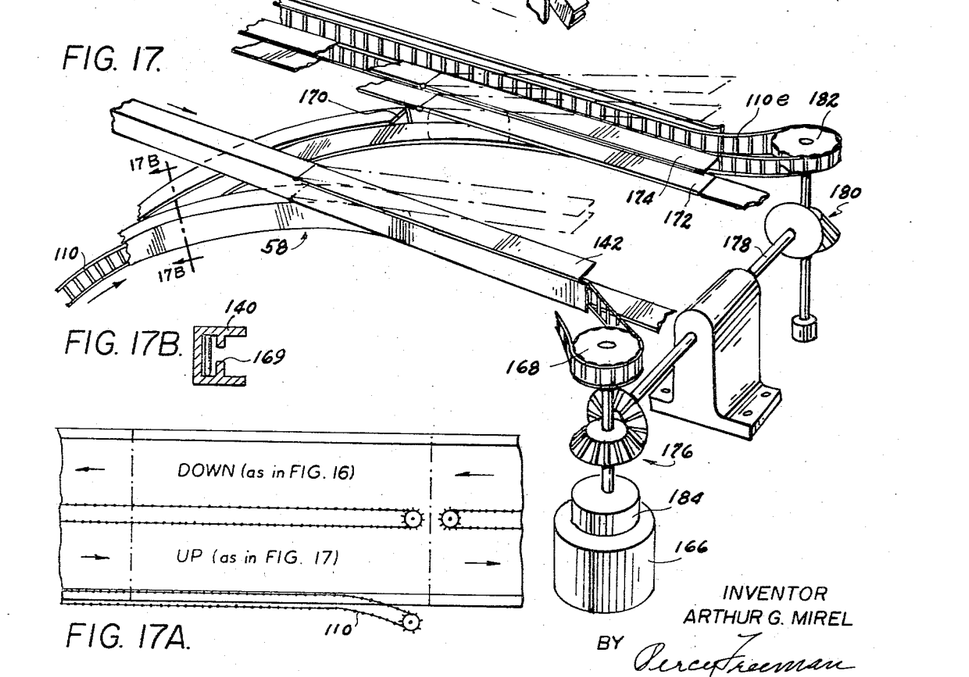
FIG. 17 is a perspective illustration of the diverting means of the invention at the part of a station where the ingress means is located.
FIG. 17A diagrammatically illustrates how the principles of the invention as applied to movement of carriers in one direction along a give path are applied to movement of carriers in opposite directions along the given path.
FIG. 17B is a transverse section taken along line 17B—17B of FIG. 17, in the direction of the arrows, to show how the advancing chain is guided by the rail of the ingress means of FIG. 17.

FIG. 17 shows the ingress means 58 in greater detail. This ingress means includes the endless chain 110, which extends along the curved rail 140 of the ingress means, this rail having the structure shown most clearly in FIG. 17B in order to guide the chain 110 through the curved path. This particular chain is driven directly from the motor 166 through a sprocket 168, and because of the chain structure shown in FIG. 8, the chain is capable of curving in the manner indicated in FIG. 17. The rails 140 have the inwardly directed flanges 169 to maintain the chain extending along the curved path. These rails 140 terminate at their upper side walls at 170, as indicated in FIG. 17, and then only the lower walls of these rails 140 extend to the underside of the pivoted rail section 142. This pivoted rail section includes the lower horizontal walls 172 which are separate from and pivoted independently of the upper walls 174. The lower walls 172 simply rest on the lower wall of the curved rail 140 while the upper wall rests at its free end, distant from the pivotal connection, on the wall of the continuation of the rail means which the free end overlaps slightly. At the side where the curved rail 140 guiding the chain is located, which is nearer to the viewer in FIG. 17, the curved bottom wall of the curved rail carries a vertical wall which guides the inner run of the chain in the manner shown in FIG. 17. In this way as each carrier moves up into the path of movement of the system the diverting rails 142 will simply be automatically raised by the glides themselves whereby carriers moving through the station will pass between the rail sections 142 without raising the latter. As may be seen from FIG. 17, the curved chain 110 is only at one side while a straight chain 110a is at the rear to engage the slides which are at the side of the carrier directed away from the viewer of FIG. 17. Therefore, inasmuch as a hook on one side may be engaged by the curved chain 110 while the hook on the other side may be engaged by the straight chain 110a, it is necessary to provide proper synchronization between the pair of chains of FIG. 17, and this is brought about by the motor 166 driving not only the sprocket 168 but also through the bevelled gear drive 176, the shaft 178 which drives a second bevelled gear drive 180 which acts on the sprocket 182 in order to drive the chains 110 and 110a of FIG. 17, and in this way the transmission is constant between the two chains so as to maintain proper synchronization for hooks on both sides of the carrier.

FIG. 17A diagrammatically shows how a dual system can be used for ingress and egress. Thus, the ingress will take place on one side of the dual system in alignment with the egress on the other side so that while a carrier can move up in the manner shown in FIG. 17, on one side of the common intermediate chain, this carrier being driven by a curved chain 110b precisely as described above in connection with FIG. 17, the other carrier can move down at the opposite of the common endless intermediate chain of dual system as indicated in FIG. 17A.

In connection with FIG. 17, it is to be noted that the motor 166 drives the bevel gear transmission 176 through a magnetic clutch 184.

It may happen that when a carrier 68 is introduced into the system, it is not intended for immediate delivery to another station but is rather intended to be stored for a relatively long period of time until the articles in the carrier are required. For this purpose, an automatic storage bin arrangement as shown in FIGS. 18-20 may be provided in accordance with the invention.

Figure 18:
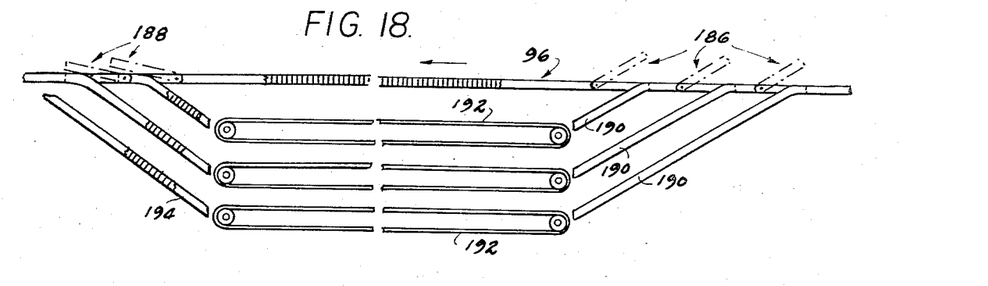
FIG. 18 is a schematic fragmentary side view illustrating how the transporting system of the invention cooperates with a storage system of the invention.
Figures 19, 20:
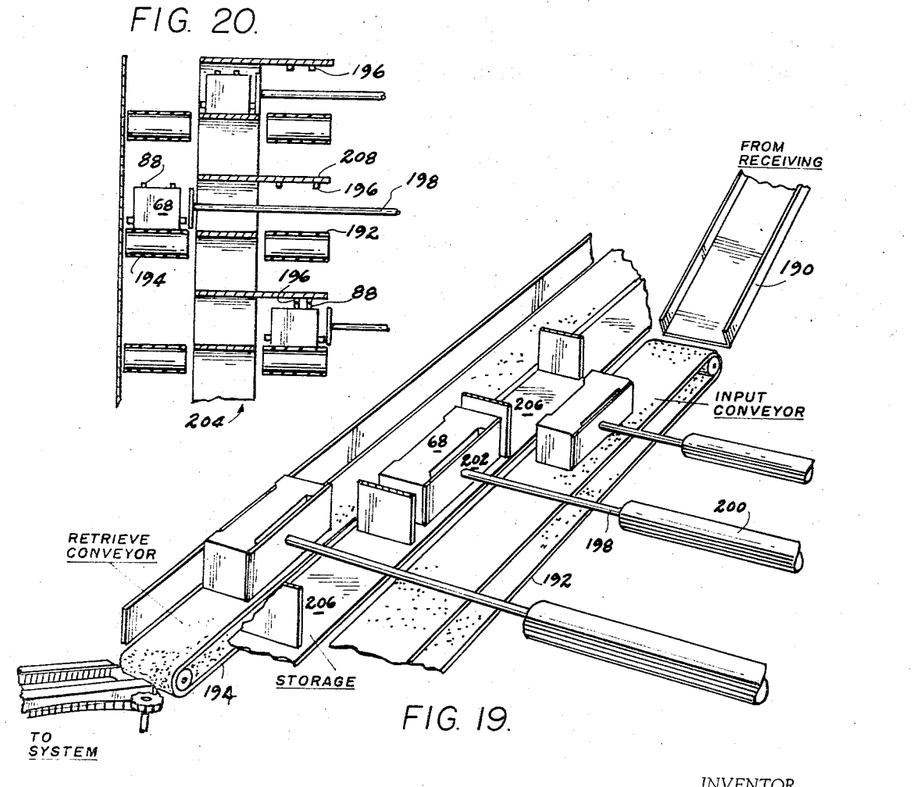
FIG. 19 shows part of the storing system in a fragmentary perspective view.
FIG. 20 is an illustration of the storing system in a transverse sectional elevation.

As may be seen from FIG. 18, assuming that the carriers are moving to the left, as indicated by the arrow, along the rail means 96, diverting rail sections 186 are provided to be displaced by solenoids, in response to predetermined automatic actuating structure, between the solid-line non-diverting positions and the dot-dash line diverting positions illustrated in FIG. 18. These diverting rail sections 186 operate in precisely the same way as the diverting rail sections 132 described above, and they are actuated in the same way by solenoid assemblies. When the sliders 88 of a given carrier are positioned so as to indicate according to a given code a particular storage bin, then the solenoid which is connected to one of the diverting rail sections 186 will be automatically actuated to displace the particular rail section to its diverting position with the result that the carrier will slide down one of the inclined chutes 190 shown in FIG. 18, depending upon the particular rail section 186 which has been turned to its diverting position.

The several chutes 190 direct the carriers to conveyors 192 which are storage conveyors in that they carry the carriers 98 to storage bins. As may be seen particularly from FIGS. 19 and 20, a storage bin assembly 204 is arranged between the storage conveyors 192 and the retrieval conveyors 194 which are coextensive with the arranged at the same elevation as the storage conveyors 192, all these conveyors being in the form of endless belts which are driven in any suitable well known manner. Thus, the arrangement includes parallel pairs of storage and retrieval conveyors 192 and 194 with the storage bin assembly 104 arranged therebetween. As is particularly apparent from FIG. 19, the storage bin assembly 204 includes horizontal rows of bins 206 arranged respectively between the pairs of parallel storage and retrieval conveyors which are at the same elevation.

As has been indicated above, the front ends of the carriers carry sliders 88 capable of being positioned so as to designate the destination of the carrier, and these sliders must close a pair of switches simultaneously, this pair of switches being situated along the path of movement of the carrier, in order to automatically actuate the structure which will terminate the movement of the particular carrier 68 when it arrives at its destination. Such pairs of switches were actuated by the sliders 88 in order to close the circuits of the solenoids which displaced the diverting rail sections 186 to their diverting positions so as to direct the carriers down a particular chute 190. In the same way, the storage bin assembly 204 is provided with shelves 208 extending over the storage conveyors 192 and carrying the pair of switches 196 which are spaced at different distances from each other so as to identify the particular storage bins 206. When a carrier 68 with a pair of sliders 88 positioned with respect to each other as to simultaneously close one of the pairs of switches 196 encounters the latter pair of switches, then the storage conveyor 192 is automatically stopped and the carrier 68 is at this time located beside the bin 206 which is identified by the particular pair of switches 196 so that the carrier 68 becomes automatically situated in front of the storage bin to which it is to be delivered. It is to be noted that the situation of the switches 196 and the location shown in FIG. 20, is only indicated schematically. Actually these switches are situated in advance of the particular storage bins to which they belong. The stopping of the movement of the storage conveyor 192 in this automatic manner also serves to automatically set into operation a pusher 198 in the form of an elongated rod extending transversely with respect to the conveyor 192 and longitudinally moved in any suitable way. For example, each rod 198 may be fixed to a piston which slides in a cylinder 200 which is supplied with a fluid under pressure such as air or liquid, although an electrical actuating structure can be used to advance the rod 198 also, if desired. Upon being actuated in the same way that the conveyor 192 has been stopped, the particular pusher 198 which corresponds to the particular bin 206, there being a pusher 198 for each bin 206, is advanced so that a plate 202 at the end of the pusher rod 198 engages the carrier 68 and advances it laterally from the storage conveyor 192 into the bin 206 to which it was addressed, and then the pusher 198 is retracted. In this way, a carrier 68 and all of the articles carried thereby are stored in a particular bin. When the articles in the particular carrier are again required for use, the operator can dial or otherwise automatically actuate the particular pusher 198 so as to advance the particular carrier out of its bin and onto the retrieval conveyor 194 which at this time is automatically set into motion by the same automatic actuating structure which actuates the particular pusher to move a carrier out of a bin. The retrieval conveyor 192 delivers the carrier 68 thereon to an inclined rail assembly 194 having an endless chain drive for advancing the carrier back up to the rail means 96, and at the upper ends of the rail assemblies 194 are situated diverting rail sections 188 capable of being automatically displaced by the carriers themselves so as to permit ingress of the carriers back onto the path along which the rail means 96 extends, and now the sliders of the particular carrier which has been removed from storage will actuate a pair of switches which identify a particular station to which the carrier will be automatically delivered. These diverting sections 188 have the same structure as the diverting sections 142 described above in connection with FIG. 17. Thus, the lower rail or wall of each diverting section 188 simply rests on the inclined upper end of the rail 194 which maintains the lower wall, corresponding to the wall 172, at the proper elevation to form a continuous lower rail portion of the rail means 96, while the upper wall of each diverting rail section 188 simply rests at its free non-pivoted end in over-lapping relationship on a succeeding rail portion. In order that these upper walls such as the upper wall 174 of FIG. 17 extend in the same plane as the succeeding and preceding rail upper wall portions, the free ends of the upper walls 174 are formed with beveled or stepped configuration which engage mating configurations of the stationary upper rail portions so that while they overlap, these upper wall portions 174 do not have a position inclined out of the plane of the succeeding and preceding rail sections.

It is, therefore, apparent that the assemblies 194 together with the pivoted rail sections 188 of FIG. 18 function in precisely the same way as the ingress means at a station module while the chutes 190 and the diverting rail sections 186 function the same way as an egress means at a station module of the invention.

Figures 21, 23:
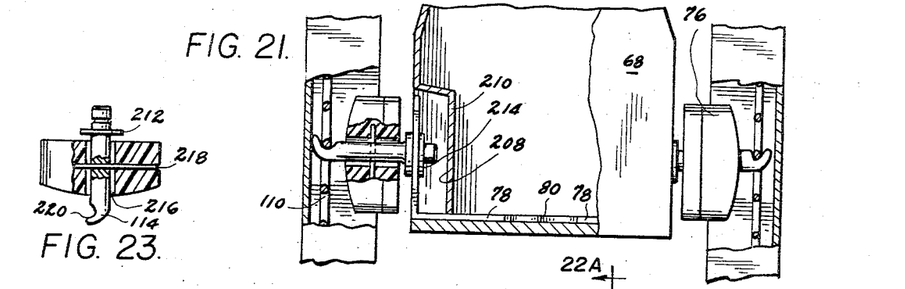
FIG. 21 is a fragmentary partly sectional illustration of the details of the support means, and in particular the unit thereof which is connected to one end of a carrier.
FIG. 23 is a partly sectional plan view of a hook-and-glide assembly of the support means.

Referring now to FIGS. 21–24, the details of the support means which supports the carriers on the rails for movement therealong and to cooperate with the advancing means are shown. Thus, referring to FIG. 21, it will be seen that in the sectional top plan view illustrated therein, the spring 80 as well as the angle brackets 78 at the front end of a carrier 68 are clearly visible. Also, FIG. 21 shows the recesses 208 for receiving the outer portions of the angle brackets 78, the walls 210 of these recesses being slotted at the section of the end wall of the carrier so as to enable the transverse portion of each angle bracket 78 to extend through the slot to locate the outer portion of the angle bracket 78 in the recess 208, there being four such recesses situated at the corners of the carrier, as is apparent from FIG. 5. As is particularly apparent from FIG. 22A, the angle brackets 78 slide in grooves formed at the inner surface of the end wall of the carrier, and the spring 80 is situated directly next to this inner surface, so that in this way a minimum amount of the interior payload space of a carrier 68 is occupied by the support means.

Figures 22, 24:
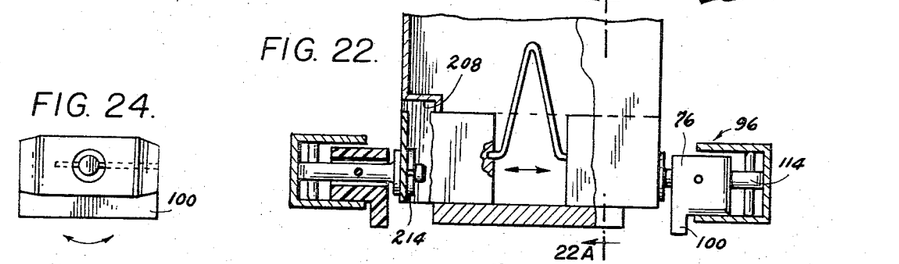
FIG. 22 shows the structure of FIG. 21 in a sectional transverse elevation.
FIG. 24 is a front elevation of the structure of FIG. 23.

The elongated hook members 114 carry the glides 76 as pointed out above, and it is apparent from FIG. 22 that the outer curved ends of the hook members 114 slide along the inner surfaces of the transverse walls of the channel members which form the rail means of the invention while the slides 76 themselves rest on the bottom walls, extending between the top and bottom walls of the rails, and the flanges 100 extend downwardly as indicated most clearly in FIG. 22. The elongated hook members 114 carry washers 212 which are in the form of collars affixed to the hook members 114, and these washers 212 may take the form of a flange which is integral with the hook member 114. To the rear of the flange 212 the hook member extends through an opening of the outer wall of the angle bracket 78, and to the rear of this outer wall, within the recess 208 the hook member 114 carries in a suitable annular groove a snap ring 214 so that in this way each hook member is affixed to an angle bracket 78 so as to be carried thereby while at the same time each hook member is capable of turning about its own axis with respect to the angle bracket 78.

The glide 76 is formed with a bore 216 through which the elongated hook member 114 freely passes and in fact there is considerable clearance for the hook member 114 in the bore 216, as is particularly apparent from FIG. 23. An elongated pin 218 is carried by the glide 76 and extends through a bore of the hook member 114 as is shown most clearly also in FIG. 23. The glides 76 are made of a suitable plastic so that they will slide easily on the metal rails.

Thus, it will be seen that with this arrangement the entire assembly of the hook and glide can turn about the axis of the elongated hook member while the glide itself can turn at the same time about the axis of the pin 218. Because of this arrangement according to which the hook 114 can turn about its own axis, while the glide 76 can turn about the axis provided by the pin 218, this latter axis being perpendicular to the hook axis, it is possible for the hook-and-glide assembly to adapt itself to any irregularities which may be encountered in the rail means 96. FIG. 24 indicates how the assembly can turn about the axis of the hook.

Figures 22A, 23A, 25, 26:
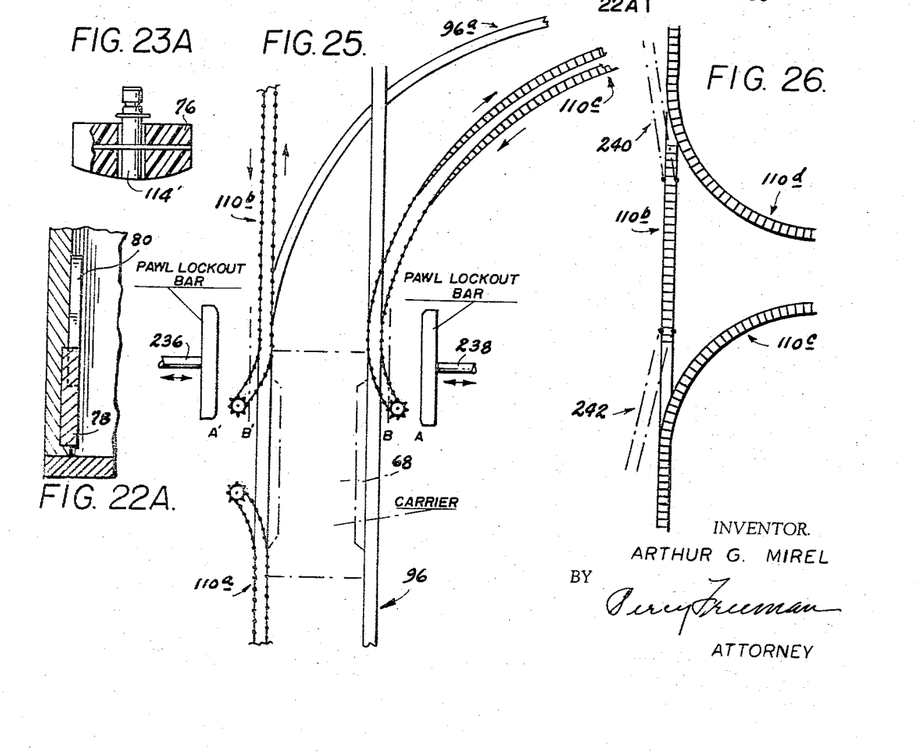
FIG. 22A is a section taken along line 22A—22A of FIG. 22 in the direction of the arrows and showing the manner in which the support means of the invention cooperates with an end wall of a carrier.
FIG. 23A is a partly sectional plan view of another embodiment of a hook-and-glide assembly of the invention.
FIG. 25 is a schematic illustration of one possible embodiment of the structure of the invention for controlling the movement of carriers either vertically across parts of the system which are situated at different elevations, or from the vertical path of movement horizontally to a part of the system which is located at a given elevation.
FIG. 26 is a schematic elevation of another embodiment of the structure of the invention for controlling the movement of articles either vertically past parts of the system which are situated at different elevations or to a part of a system which is located at a selected elevation.

FIG. 23A shows an arrangement where the hook 114' has a structure identical with that of the hook 114 except that it does not project beyond the glide 76, and this assembly of FIG. 23A is used at that side of a carrier where there is to be no engagement with an advancing chain 110. Certain types of carriers will be advanced to destinations in a manner where at one side they are not driven and do not cooperate with the chain. For example, in the dual type of system where the carriers are moved simultaneously in opposite directions by an elongate central chain, these carriers which move simultaneously in opposite directions respectively cooperate with opposite runs of the same chain, while the sides of the carriers which are directed away from the chain do not engage any chain or other advancing structure, and thus with such arrangement a glide assembly as shown in FIG. 23A can be used.

As is apparent from FIG. 23, the outer free end of the hook 114 is formed with an inclined surface 220 which directly cooperates with the chain 110. The angle of this surface 220 is such that there will be a smooth engagement between each carrier and the chain which advances the same. As has been indicated above in connection with FIG. 7, the chains are guided along curved plate portions 106a and 106b to and from the straight portions of the runs which engage in advance of the hooks, and the inclination 220 of the hooks is designed to extend at least approximately along and tangent to the curvature of the chain so as to provide a smooth engagement between the chain and the hook.

Figures 23B, 23C, 27:
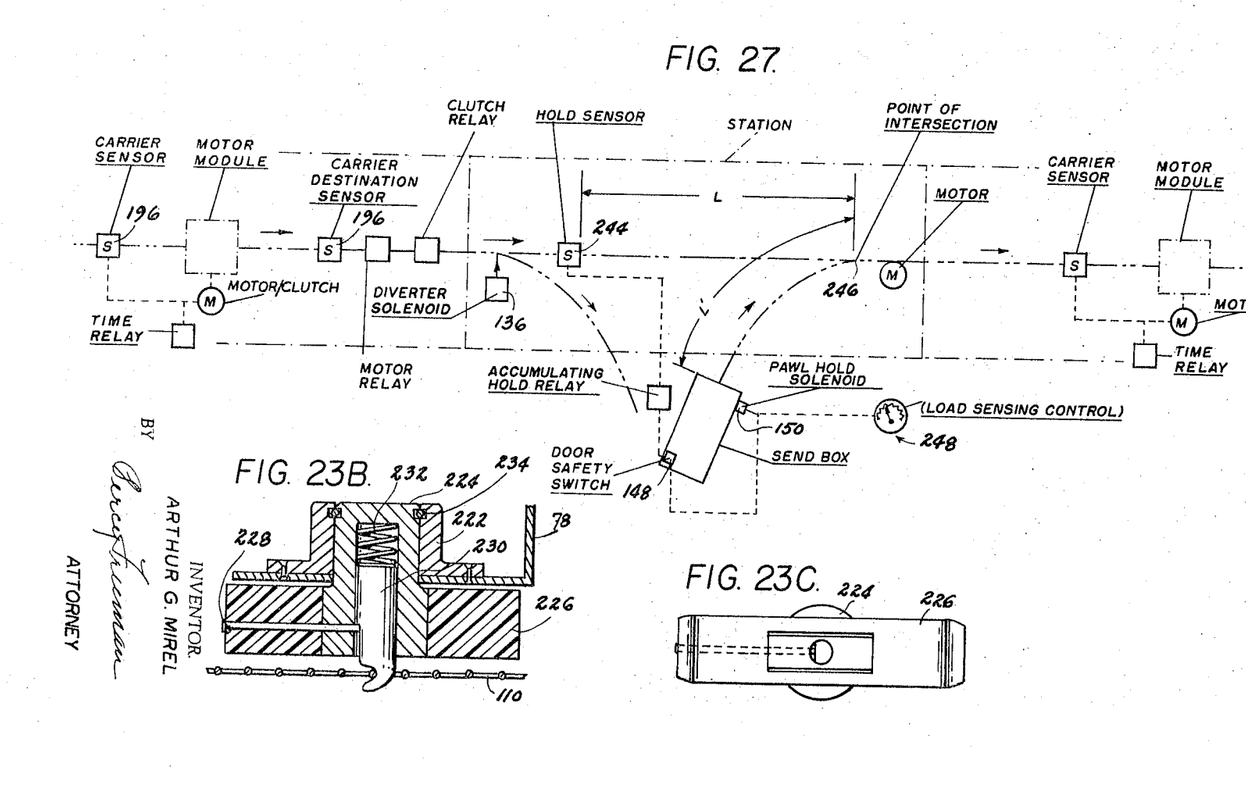
FIG. 23B is a transverse section of another embodiment of a unit of a support means of the invention for supporting an article while cooperating with an advancing means which advances the article.
FIG. 23C is a front elevation of the structure of FIG. 23B.
FIG. 27 is a block diagram illustrating the manner in which the electrical structure of the invention operates automatically to control the movement of the carriers along the system as well as into and out of the system.

Referring to FIGS. 23B and 23C, a different type of glide-and-hook assembly is illustrated therein. According to this construction the carrier 68 simply carries a bearing 222 which is aligned with an opening at each corner of the carrier, the opening being formed in the outer side wall of the carrier, and a rotary hollow member 224 is supported for rotary movement in the bearing 222 and extends outwardly beyond the side wall of the carrier. This hollow rotary member 224 fixedly carries the glide 226 which is in the form of a simple elongate rectangular member having inclined front and rear surfaces at its outer face, as is true of all of the glides which are more or less continuously curved at their outer surfaces in the manner shown in FIGS. 21 and 23. The glide 226 and the rotary member 224 carry an elongate pin 228 which projects into an elongate groove which extends axially of the hook member 230 of this embodiment, and this hook member 230 being received in the cylindrical bore which forms the hollow interior of the rotary member 224. A spring 232 urges the hook member 230 outwardly from the cylindrical bore of the rotary member 224 until the inner end of the axial groove of the hook 230 engages the pin 228, as shown in FIG. 23B. The hook 230 cooperates with the chains 110 in precisely the same way as the above-described hooks, as is apparent from FIG. 23B. At its inner end, the rotary member 224 is formed with an annular groove which is aligned with an annular groove formed at the interior of the bearing 220 and these aligned grooves house a retaining ring 234 which serves to retain the rotary member 224 in the position illustrated in FIG. 23B. Of course, the structure shown in FIG. 23B is included at each corner of the carrier 68 at the outer sides thereof and at the region of the lower walls thereof, so that four assemblies as shown in FIG. 23B are provided for each carrier 68.

While in the form shown in FIG. 22, the hooks 114 project rigidly beyond their respective glides 76, the hooks 230 in FIG. 23B are mounted to yield axially whenever the tip of the hook encounters a cam or other transition piece during travel of the carrier through the system.

The several portions of the path along which the system of the invention extends may be located at different elevations, and the system may include vertical rails directing carriers vertically from one elevation to another elevation so that in this way the articles can be transferred between different stories of a given building, for example.

Referring now to FIG. 25, there is diagrammatically shown therein a vertically extending rail means 96. The carrier 68 which is shown in dot-dash lines at the lower part of FIG. 25 is being advanced upwardly by the chain 110a, and it will be noted that the front or upper end of the carrier 68 has reached the regions of chains 110b and 110c. Thus, while the carrier 68 is advanced upwardly, its front end can either cooperate with the vertically extending chain 110b which will advance the carrier to a higher elevation, or the hook or pawl 114 at the upper right corner of the carrier 68 of FIG. 25 can be engaged by the curved chain 110c which will advance the carrier 68 through the curved rail portion 96a to the particular elevation of a portion of the system.

Depending upon the station designated by the sliders of the particular carrier 68 an electrical control structure will be actuated to displace either the bar 236 or the bar 238 to an operative position where it will engage the hook 114, so as to displace the hook out of engagement with one of the chains. Thus, it will be seen that if the bar 236 is advanced to the right, as viewed in FIG. 25, the hook at the upper left corner of the carrier 68 of FIG. 25 will not be able to engage the vertically extending chain 110b, while the hook 114 at the upper right corner of the carrier 68 will engage the chain 110c so that in this way the carrier 68 will be advanced out of the vertical part of the rail means into a horizontal portion thereof. On the other hand, if the bar 238 is advanced to its operative position then the hook 114 at the upper right corner of the carrier 68 will not be able to cooperate with the chain 110c with the result that the carrier 68 will continue to advance upwardly. These hook lockout bar assemblies 236 and 238 are electrically actuated in a completely automatic manner and returned to their inoperative positions as soon as the carrier is moved past the point at which its direction of further movement will be determined.

Operating in conjunction with or even instead of the hook lockout bar assemblies is a structure as shown in FIG. 26. Thus, it will be noted that the chain 110b cooperates with diverting rail sections 240 and 242 which are identical with the diverting rail sections referred to above and which are actuated in the same way by suitable solenoids so as to be displaced to or from the diverting positions illustrated in dot-dash lines in FIG. 26. Thus, assuming, for example, that a carrier is moving downwardly, being advanced in this direction by the chain 110b, then if the diverter 240 is displaced to its diverting position as shown in dot-dash lines in FIG. 26, the carrier will be diverted to the curved chain 110d, so that in this way a downwardly moving carrier can be diverted to a portion of the system which is situated at an upper level. In the same way, an upwardly moving carrier such as that moved upwardly by the chain 110 can be diverted to the curved chain 110c by displacing the diverter section 242 of the rail means to the dot-dash lines position indicated at the lower portion of FIG. 26. Of course, when these rail sections are not in their diverting positions, they simply form continuations of the succeeding and preceding rail sections to guide the carrier in a straight path. As was indicated above, these diverting sections can be used by themselves to perform functions similar to the hook lockout bars 236 and 238, or these bars may be used together with the diverting rail sections.

The arrangement of the electrical control structure of the invention is indicated schematically in FIG. 27. Thus, it will be seen that various carrier sensors are provided in order to detect the destination to which a carrier is to go, and these carrier sensors are in fact pairs of switches 196 as described above in connection with FIG. 20, and although, for example, a certain station module is shown centrally in FIG. 27, the destination sensor which identifies this particular station need not be located at the station itself, and although it forms part of the station in the sense that it forms a station-identifying means therefor, it may be located in advance of the particular station which it identifies. Thus, for example, one of the pair of left carrier sensors shown in FIG. 27 may designate the particular station as shown in FIG. 27 so as to actuate suitable structure in advance of the arrival of the carrier at this station so as to divert the carrier to the egress means at this station. It is to be noted that the diverter solenoid 136 is indicated in FIG. 27 at the station illustrated therein so as to actuate the diverting rail section in order to direct a carrier out of this system in the event that the station-identifying means 196 detects the presence of a pair of slides whose positions match that of the pair of switches 196. In addition, FIG. 27 illustrates diagrammatically various cumulative time holding relays which form part of the control structure, and these relays control the driving motors of the various units as well as the clutch which transmits the drive from the motor to the transmission assemblies which drive the chains, as described above. In addition, FIG. 27 shows the arrangement of the switch 148 which is actuated by the door at the end of the ingress means designated at a send box in FIG. 27, and, of course, the delay means formed by the solenoid 150 is also indicated in FIG. 27 at the ingress means. FIG. 27 in particular shows the relationship between the distances L and L'. It is in this way that the logic circuit of the invention is capable of automatically introducing carriers without any possibility of collision. Thus, the hold sensor 244 will sense the arrival of a carrier to initiate a "hold" by energizing solenoid 150, thus holding the entering carrier until the moving carrier has passed the "Point of Intersection" (FIG. 27) and at this moment the solenoid 150 is released to permit the carrier to be introduced into the system at the point of intersection 246. The speed of movement of the carriers being more or less equal, the distance L' is sufficiently shorter than the distance L to guarantee that when the holding sensor 244 senses the entry of the next carrier into the station, the entering carrier will have passed through the distance L' so as to be safely situated in front of this next carrier sensed by the holding sensor 244, and thus in this way the possibility of collision is avoided with the automatic structure of the invention. These results are brought about primarily by the cumulative time holding relays of the system.

It is furthermore to be noted that FIG. 27 shows a load sensing control 248 which is described in greater detail below in connection with FIG. 29 and which is capable of automatically sensing the weight of the carrier plus the articles carried thereby so as to accelerate the velocity of the carrier at a uniform rate.

Figure 28:
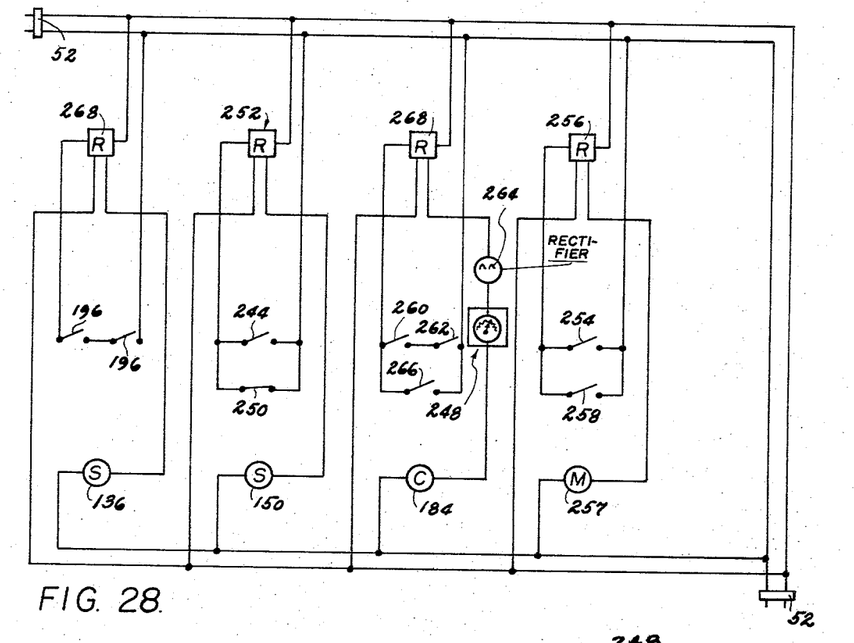
FIG. 28 is a wiring diagram of the electrical control structure of the invention.

Referring now to FIG. 28, one example of the circuitry of the invention is illustrated therein, this circuitry corresponding to the logic circuit which is indicated in FIG. 4 as forming part of the module 44. It will be noted that FIG. 28 diagrammatically indicates the electric connectors 52 by which one unit of a module is electrically connected with another unit of the next module.

The electrical control circuit of the invention is designed to be compatible with the various requirements of the structure. Its operation is based on the use of cumulative time hold relays which have the capability of cumulatively holding a fixed time factor. In order to insure a full time delay period after the last impulse is imparted, a reset to zero time occurs each time an impulse occurs before completion of any one time cycle. This circuit employs these cumulative time hold relays in a manner to prescribe an orderly sequential time pattern compatible with the requirements of this system. This concept is analogous, in mechanical mechanism, to a set of timing cams mounted on a common shaft for integrating the timed relationship of several functions performing a definite repeating procedural pattern.

This technique of pre-setting time values for individual circuits working in timed relation with each other using electric cumulative time hold relays is made possible by virtue of the fact that the several hooks 114 are engaged by chains 110 travelling at known velocities so that the positions of any carrier should be accounted for at any instant.

The circuit shown in FIG. 28 includes the normal closed switch 250 which, upon opening of the door 146 of an ingress means (FIG. 11) permits the switch 250 to assume its closed position thus energizing the cumulative time holding relay 252. As a result, the solenoid 150 which is in the circuit of the relay 252 is actuated to assume the position shown in FIG. 14 preventing the hook 114 from engaging the chain for a given time period.

As the carrier 68 advances into the ingress means it trips the normal open switch 254 so as to energize the cumulative time holding relay 256 and thus start the motor 257 which may be any one of the motors such as the motor 166 shown in FIG. 17, and the period of operation of the motor is sufficient to carry the inserted carrier out of the station into which it is inserted plus a certain cooldown period for the motor before it is started again. The motor 257 is also capable of being started by the normally open switch 258 which is located in the path of carrier travel. The leads from the switch 258 are connected to the common terminals of the relay 256. It is clear, therefore, that the on-time cycle for the motor 257 can be initiated by a passing carrier through actuation of the switch 258 or through actuation of the switch 254 at the ingress means.

The continued advancement of a carrier along the ingress means trips the switch 260 so as to arm the circuit of the clutch 184. However, actuation of this clutch cannot take place until the normally open switch 266 is returned to its normally open position in order to start the time cycle. After the door 146 is closed and the normally open switch 262 closes, the circuit of the clutch 184 is closed. The switch 262 is mounted in direct contact with the solenoid 150. This solenoid returns to its normal inoperative position after the relay 252 has completed its specified time cycle.

The cumulative time holding relay 252 has a set time value imparted to the solenoid 150 which is determined by the time necessary for a carrier to leave the ingress means, at its entrance end, and to arrive at the point of intersection 246 designated in FIG. 27. This arrival should take place earlier than that of a carrier advancing to the same point of intersection from the other end of the distance L at the location where the hold sensor 244 is situated. The hold sensor is in the form of a normally open switch 244 located in the line of carrier travel through the station, and the situation of this switch to the circuit of the relay 252 is indicated in FIG. 28.

Therefore, in operation, the hook release solenoid 150 actively controls the proper time, based upon the relative distances L, L' for a carrier to enter the system safely after the last carrier has triggered the switch at 244 and relay 252, at the hold sensor position, and furthermore this structure provides a non-engaging condition for the hook 114 when the operator places a carrier in the ingress means and the door 146 is opened.

The normally open switch 266 is located in the line of carrier travel at a point which is set in advance of the destination sensor and a preceding chain loop. In this position the passing carrier trips the switch 266 momentarily to energize the relay 268 and the clutch 184 so as to insure that there is a moving chain loop prior to engagement of the carrier with this chain loop.

FIG. 28 also shows diagrammatically a pair of switches 196 which identify a particular station and which are actuated by a matching pair of sliders, as described above. These switches are connected in series with the cumulative time holding relay 268 which can only be energized when both of the switches 196 are closed, and upon closing of these switches the diverter solenoid 136 will be actuated so as to provide egress of a carrier at its destination. Thus, positive energizing of this particular part of the circuit is wholly dependent upon the simultaneous triggering of the pair of switches 196. Of course, any carrier which has its sliders set to bypass one or more of the switches 196 will simply be carried through the system until it reaches its proper destination, where a particular diverter solenoid 136 will be actuated.

Figures 29, 30, 31:
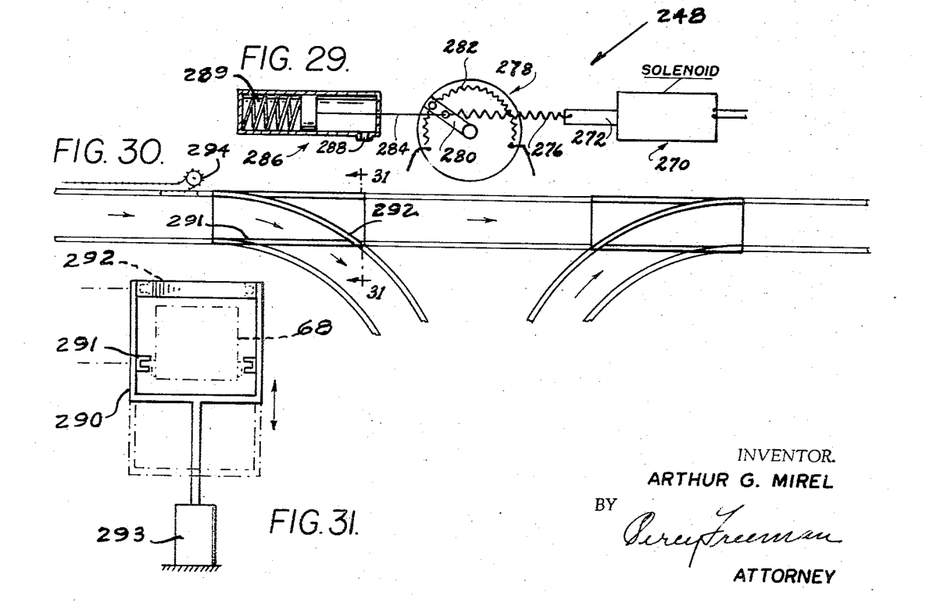
FIG. 29 is a schematic illustration of that part of the structure of the invention which provides the proper control of accelerating speed of movement of the carrier and articles carried thereby, irrespective of their weight.
FIG. 30 is a schematic plan view of a lateral diverting section showing ingress and egress paths from a main system.
FIG. 31 is a typical end view as viewed on line 31—31 of FIG. 30 in the direction of the arrows.

It is to be noted that there is situated in the feed line of the clutch 184 a rectifier 264 as well as the load-sensing unit 248 which is shown in detail in FIG. 29.

As may be seen from FIG. 29, the load-sensing unit 248 includes an energy loading device, for example a solenoid 270 which has an armature 272. The armature 272 pulls on the spring 276 which is tensioned between and connected not only to the armature 272 but also to the arm 280 of a variable resistor 278 in the form of a suitable potentiometer which has its arm 280 moving along the resistor 282 so that a variable resistance will be set into the circuit depending upon the sweep of the arm 280. A cable 284 extends from the arm 280 to a dash pot 286 which has an adjustable orifice 288 which provides a predetermined rate of movement of the dash pot in response to pulling on the cable 284 when the arm 280 is turned in a clockwise direction by the spring 276 which was loaded by the actuation of solenoid armature 272. Following deenergization of solenoid 270, return spring 289 retracts the entire assembly to its original starting position. Thus, when relay 268 is pulsed to feed clutch circuit 184 (FIG. 28) the value of current to this clutch is uniformly increased from a slip to full engaged condition. The sweep of arm 280 across the variable resistance 282 will automatically find the optimum current value matched to the different drag resistances represented by the load of the differently laden carriers.

Load sensing unit 248 is placed in series with this clutch circuit.

Correspondingly, a lightly laden carrier would require less angular motion of the arm 280; that is, this carrier would be accelerated to its maximum velocity at an earlier portion of the sweep arm 280 than that of a heavily laden carrier. Therefore, a time relay 268 is pulsed by the clutch-start switch. Normally open contact of the relay actuates the load sensor solenoid 270 and clutch voltage is gradually increased through the sweep of the potentiometer arm 280. Upon completion of the predetermined elapsed time, determined by the logic system, the relay 268 opens, thereby breaking the circuit to the solenoid 270 allowing potentiometer to return to the starting position.

In order to divert carriers in and out of a system in a horizontal plane laterally disposed to the normal line of carrier travel, a diverting method as shown in FIGS. 30 and 31 is described as follows.

A framed structure 290 has two principal rail sections, i.e., a straight section 291 located at the lower end of said structure and a curved section 292 located at the upper end thereof. These two principal rail sections are provided to form continuity of curved or straight rails, selectively, by the proper actuation of the framed structure to the extreme limits of its travel in a vertical manner. Motion is imparted by the actuation of solenoid 293.

In operation, a carrier 68 advancing toward the lateral diverting section exits from the advancing means at sprocket 294. The forward momentum of the carrier advances it through the diverting section area.

FIG. 31 illustrates conditions necessary for straight carrier travel.

In this instance, the framed structure 290 is in its extreme up position with the rail section, at the lower end, in a common alignment with the adjacent rail section for straight carrier travel. Downward movement of the framed structure 290 to its extreme downward position aligns the curved rail section 292 to coact with the adjacent rails to provide a curved exit path for the carrier.

Actuation of solenoid 293 is determined by the carrier destination sliders 88 in a matched pattern to the particular diverting station code as previously described.

The same principles of operation, as described for diverting carrier out of a normal straight line travel, is used for carrier entry from a curved to straight line function, as shown in right half side of FIG. 30.

Following carrier travel through the diverting section, continuity of carrier travel is accomplished in the previously described manner.

Thus it will be seen that the structure of the invention provides a modular system capable of being prefabricated in its entirety and assembled at any site to provide a system which is adapted to the particular requirements of a particular location, and at the same time the structure is quite simple and reliable in operation while avoiding the necessity of any central station to which all carriers must be sent and from which all carriers must be dispatched.

What is claimed is:

1. An automatic article-transporting system comprising, hollow rail means having a longitudinally extending opening, said rail means extending along a predetermined path in continuous multi-plane configurations extending in vertical and horizontal attitudes which path includes a plurality of stations, a plurality of carriers adapted to carry articles which are to be transported, support means operatively connected to each carrier for supporting the latter on said rail means, said support means moving along said rail means during transportation of articles carried by a carrier, advancing means extending at least in part along and confined within said rail means and engaging said support means for advancing the latter together with the carrier to which it is operatively connected along said rail means so as to transport the carriers along said predetermined path, adjustable station-designating means carried by each carrier and having a plurality of different positions respectively designating said plurality of stations, said adjustable station-designating means being placed in a selected one of said positions thereof for designating a selected station, and a plurality of different station-identifying means respectively situated at the said stations and respectively matching said positions of said station-designating means carried by each carrier, each of said station-identifying means coacting electrically with the station-designating means of said carriers for initiating an event for egress of a carrier by imparting an electric impulse, and for consummating the event as a function of programmed time independent of physical linkage.

2. A system as recited in claim 1 and wherein a plurality of station modules are respectively situated at said stations and a plurality of additional modules are situated along said path between said station modules, each of said modules including part of said rail means and part of said advancing means and said station modules additionally including said station-identifying means, said modules being prefabricated and assembled together along said path, an ingress means operatively connected to each station module for providing ingress of a carrier to said rail means at each station module, and an egress means operatively connected to each station module for providing egress of a carrier from said rail means when the station-identifying means of a given station module detects a matching station-designating means of a carrier.

3. A system as recited in claim 1 and wherein each carrier has opposed end portions which are of a greater cross-sectional area than an elongated intermediate portion of said carrier which extends between said end portions thereof, so that said carrier can execute turns without binding against said rail means.

4. A system as recited in claim 1 and wherein said support means includes for each carrier at least one hook to be engaged and advanced by said advancing means, a bracket carrying said hook and mounted on said carrier for lateral movement relative thereto, a spring engaging said bracket to urge the latter outwardly of said carrier for placing said hook in engagement with said advancing means, and a glider carried by said bracket and slidably engaging said rail means for gliding therealong.

5. A system as recited in claim 4 and wherein a plurality of ingress means are respectively situated at said stations for giving ingress of a carrier to said rail means at each of said stations, and time delay means at each ingress means for engaging said bracket and displacing the latter inwardly toward the interior of a carrier in opposition to said spring to prevent said hook from being engaged by said advancing means until a time when there is along said path no other carrier with which a carrier moving from said ingress means to said path can collide.

6. A system as recited in claim 1 and wherein said path includes substantially horizontal portions situated at different elevations and substantially vertical portions extending between said horizontal portions.

7. A system as recited in claim 1 and wherein said rail means includes a plurality of elongated channel members distributed along said path, and said advancing means including a plurality of endless chains also distributed along said path and each having one run extending along the interior of said channel members, the latter being formed with openings through which said one run of each chain extends substantially angularly at the ends of said one run outwardly around a rotatable sprocket away from said channel members and the other run of each chain being situated beyond said channel members defining a curved entry and exit at the terminal ends of each chain loop, said support means including gliders connected to each carrier and slidably engaging said channel members in the interior thereof for gliding therealong, and a hook connected to each glider engaging said chain to be advanced thereby, said curved portions providing a straight-line entry and exit of said hook into and out of said chain.

8. A system as recited in claim 7 and wherein an egress means is situated at each station for providing egress of a carrier from said path in a vertical attitude, each egress means including an elongated diverting rail channel section pivotally connected at one end to a succeeding channel section, a branch channel section branching laterally from a channel section as an opposite end of said diverting channel section, said diverting channel section having a non-diverting position forming a continuation of adjoining channel sections to prevent access of a carrier to said branch channel section, and displacing means operatively connected to said diverting section for displacing the latter to a diverting position where it extends angularly from said succeeding section to which it is pivotally connected, whereby a carrier arriving at said station will move onto said branch section instead of continuing along said path through said diverting section when the latter is in said non-diverting position thereof.

9. A system as recited in claim 8 and wherein an electrically timed circuit is operatively connected to said diverting section for displacing the latter from said non-diverting position to said diverting position thereof, said electrical means being connected into an electrical circuit which includes said station-identifying means, and said station-identifying means closing said circuit when actuated by a matching station-designation means carried by a carrier, so that when a matching station-designating means is detected by a given station-identifying means a carrier will be automatically diverted to said branch channel section at a given station to have egress from said path.

10. A system as recited in claim 1 and wherein a plurality of ingress means are respectively situated at said stations for giving ingress of a carrier to said rail means, and electrically-programmed timed circuitry to provide delay means at each ingress means for acting on the support means of a carrier inserted into said ingress means to prevent operative engagement between said support means and said advancing means until a time when there is along said path no other carrier with which a carrier moving from said ingress means to said path can collide.

11. A system as recited in claim 10 and wherein said electrically-programmed timed circuitry means is situated in an electrical sensing circuit which senses the movement of carriers along said path, said circuit including a plurality of cumulative time holding relays.

12. A system as recited in claim 1 and wherein a plurality of ingress means are respectively situated at said sations for giving ingress of a carrier to said path at said stations, and means automatically sensing the load of a carrier at the initiation of motion for advancing the carrier at a controlled accelerated rate of speed from said ingress means into said path irrespective of the load and drag of the carrier.

13. A system as recited in claim 12 and wherein said means for automatically sensing said load includes a power device having a link which is displaced to load an energy-storing means, connecting means between said link and said energy-storing means, a movable element for varying power values secured to said energy-storing means, and means to controllably retard movement of said movable element until said movable element has moved to match the power value, and means attached to said retarding means for restoring the entire assembly to its initial position, when said power is removed.

References Cited

UNITED STATES PATENTS

| | | | |
|---|---|---|---|
| 2,619,916 | 12/1952 | Rainier | 104—172 |
| 2,635,555 | 4/1953 | Hansson | 104—88 |
| 2,940,400 | 6/1960 | Harrison | 104—88 |
| 2,982,227 | 5/1961 | Bishop et al. | 104—172 X |
| 3,156,193 | 11/1964 | Anderson et al. | 104—88 |
| 3,174,438 | 3/1965 | Hariton | 104—172 X |

ARTHUR L. LA POINT, *Primary Examiner.*

S. B. GREEN, *Assistant Examiner.*